United States Patent [19]

LeCompte

[11] Patent Number: 5,125,590
[45] Date of Patent: Jun. 30, 1992

[54] COMPLIANT BOBBIN FOR AN OPTICAL FIBER WOUND PACK

[75] Inventor: George W. LeCompte, Tucson, Ariz.

[73] Assignee: Hughes Aircraft Company, Los Angeles, Calif.

[21] Appl. No.: 640,755

[22] Filed: Jan. 14, 1991

[51] Int. Cl.$^5$ .................. B65H 75/14; B65H 75/24
[52] U.S. Cl. ................... 242/118.4; 242/117; 242/118.5; 242/118.7; 242/159
[58] Field of Search .......... 242/118.4, 118.5, 118.6, 242/118.7, 118.2, 118, 71.9, 117, 159

[56] References Cited

U.S. PATENT DOCUMENTS

| | | | |
|---|---|---|---|
| 869,871 | 11/1907 | Barnes | 242/71.9 |
| 2,982,493 | 5/1961 | Sibille | 242/118.2 |
| 3,266,748 | 8/1966 | LeBus, Sr. | 242/117 |
| 3,330,499 | 7/1967 | Gooding | 242/117 |
| 3,522,700 | 8/1970 | Fisher, Jr. | 242/118.2 X |
| 3,659,799 | 5/1972 | Cerutti et al. | 242/71.9 |
| 3,840,198 | 10/1974 | Moore | 242/71.9 X |
| 4,088,282 | 5/1978 | Day | 242/118.2 |
| 4,117,988 | 10/1978 | Moore | 242/71.9 |

FOREIGN PATENT DOCUMENTS 39766  3/1979  Japan ................ 242/118.5

Primary Examiner—Stanley N. Gilreath
Attorney, Agent, or Firm—R. M. Heald; C. D. Brown; W. K. Denson-Low

[57] ABSTRACT

A hollow winding bobbin base (18) is constructed of a material having a relatively low thermal coefficient of expansion (e.g., quartz) and has a pair of flanges (32) slidably located on the ends. A metal tube (24) is received within the base (18) and has annular springs (40) on its ends urging the flanges (32) toward each other. An elastomer baselayer (30) is fitted onto the outer surface of the base (18).

8 Claims, 3 Drawing Sheets

COMPLIANT BOBBIN FOR AN OPTICAL FIBER WOUND PACK

BACKGROUND OF THE INVENTION

1. Field of the Invention

The present invention relates generally to a bobbin on which a length of an optical fiber is wound, and, more particularly, to such a bobbin which is compliant in order to reduce the possibility of inducing tension or microbending into the fiber.

2. Description of Related Art

An optical fiber as used in telecommunications, for example, consists of a quartz core serving as the light guide that is surrounded by a polymer ("buffer") coating. When the fiber is wound into a coil on a bobbin the resulting pack exhibits a highly polytropic behavior; axial deformation due to temperature and water absorption into the buffer is relatively large while radial deformation is relatively small due to the reinforcement effect provided by the quartz fiber core. A conventional bobbin or other structure on which the fiber is wound produces a restriction in the axial deformation and any change in buffer bulk will cause undesirable fiber strain.

A quartz fiber core has a relatively high elastic modulus (at least several orders of magnitude greater than that of the buffer). The springs formed by long hoops or loops of the core on a wound pack are much more compliant than the interleaved springs formed by the comparatively thin buffer coating. As a result, any loads imposed on the fiber pack by the winding of overlying layers or the expansion of the buffer coating are reacted by changes in the quartz core hoop tension.

An example of undesirable behavior is what occurs during temperature cycling of dispensers for an optical fiber wound pack as used in certain guided missiles, for example. When heated, the metal pack bobbin expands which forces the fiber to stretch and increase pinch loading of the fiber buffer. At the higher temperature, an acceleration of relaxation ("creep") of the buffer material is experienced. Relaxation of the buffer material, in turn, causes tension in the quartz core to drop which does not, however, return to its prior levels when the dispenser assumes the original temperature. Subsequent cooling causes the metal bobbin to contract which further lowers fiber tension and introduces the threat of middle layers of a pack being driven into compression.

It is, therefore, a desideratum to provide a technique of bobbin construction which will prevent or substantially reduce tension of the quartz core of an optical fiber being induced as a result of temperature- and humidity-induced dimensional changes in the buffer coating.

SUMMARY OF THE INVENTION

In accordance with the practice of the present invention, the bobbin base on which the fiber is wound includes a hollow base or mandrel made of a suitably low thermal expansion material (e.g., quartz). Also, a pair of cylindrical flanges are slidingly received on the base from each of its ends. A metal tube is located within the quartz base and includes on its outside end portions first and second springs which are exerted against the flanges providing them with resilient ability to be lengthened along the base longitudinal axis.

In addition, an elastomer base layer made of a highly compliant material is fitted onto the outer surface of the quartz base intermediate the flanges. This base layer performs two separate desirable functions: it provides shear compliance allowing the fiber pack to expand and contract in the axial direction as a result of buffer material changing volume; and by proper choice of thickness, the radial compliance of the baselayer can be made to match the radial compliance of the fiber pack permitting winding tension to be canceled out by the load imposed as subsequent layers are wound onto the pack.

DESCRIPTION OF PREFERRED EMBODIMENTS

Figure 1A:
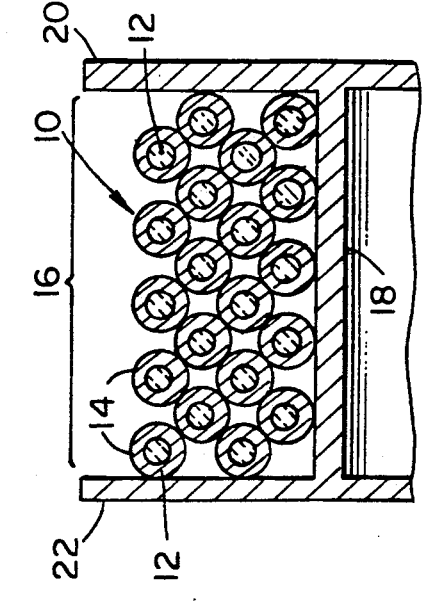
FIGS. 1A, B and C depict sectional views of a conventional fixed-pitch optical fiber pack showing the effects on the pack when the buffer increases in dimensionality.
Figure 1B:
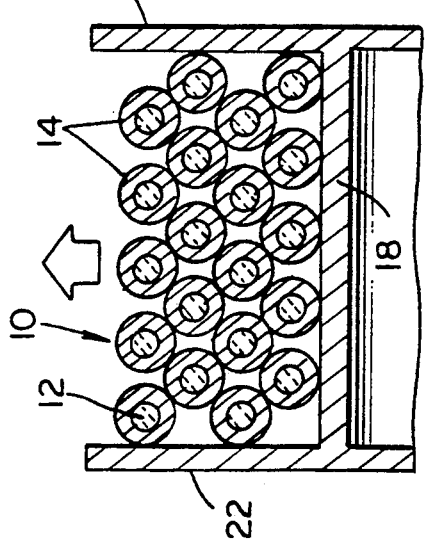
Figure 1C:
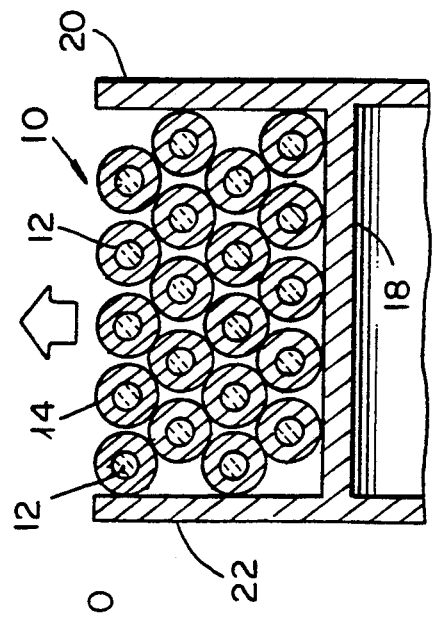

With reference now to the drawing and particularly FIGS. 1A–1C, an optical fiber 10 is seen to consist of a central glass or quartz core 12 enclosed within an outer buffer coating 14. Although the core contracts and expands with temperature, the buffer coating does so to a greater extent producing a differential in dimensional thermal changes which in the entire pack 16 results in tension being induced in the core 12. It is well known that a glass fiber core is very prone to breakage from tensile forces and even if only subjected to microbending this can result in a substantial reduction in the efficiency of light signal transmission along the fiber. Accordingly, in all uses attempts are made not to stress the fiber unduly or to induce even small amounts of bending.

It has also been customary to wind fiber packs directly onto a metal mandrel or bobbin (e.g., aluminum). In that case, upon temperature increase the metal tends to expand to a greater extent than the fiber glass core producing unwanted stress in the core with the undesirable results already noted.

FIG. 1A shows a pack 16 formed by winding the optical fiber 10 into a generally cylindrical form on a conventional mandrel or bobbin 18. Flanges 20 and 22 are provided at the two ends of the bobbin for defining fixed end walls for the pack. On turning to FIG. 1B, it is seen that the fiber buffer has increased in cross-sectional dimensions over FIG. 1A, assumedly because of temperature increase, moisture absorption, or both. Since the length of the pack cannot increase because of the flanges, the pack radial dimensions must increase from the nominal amount shown in FIG. 1A to that of FIG. 1B. Similarly, with further increase in temperature, or further absorption of moisture by the buffer, the FIG. 1C condition is arrived at where the pack radial thickness is greater than either FIGS. 1A or 1B. It is apparent that with the changing dimensions of the pack the glass (quartz) core in FIGS. 1B and 1C is stressed substantially over the condition shown in FIG. 1A. Of course, the maximum amount of stress that may be developed in this way is dependent upon how many layers of fiber are laid down on the bobbin.

It has been assumed in FIGS. 1A-1C that the major physical change has been that occurring in the buffer. However, if there is a temperature increase and the bobbin were metal, as it typically is, there would be a substantial increase in the cross-sectional dimensions of the bobbin which, in turn, would increase the fiber core stress still more.

Figure 3:
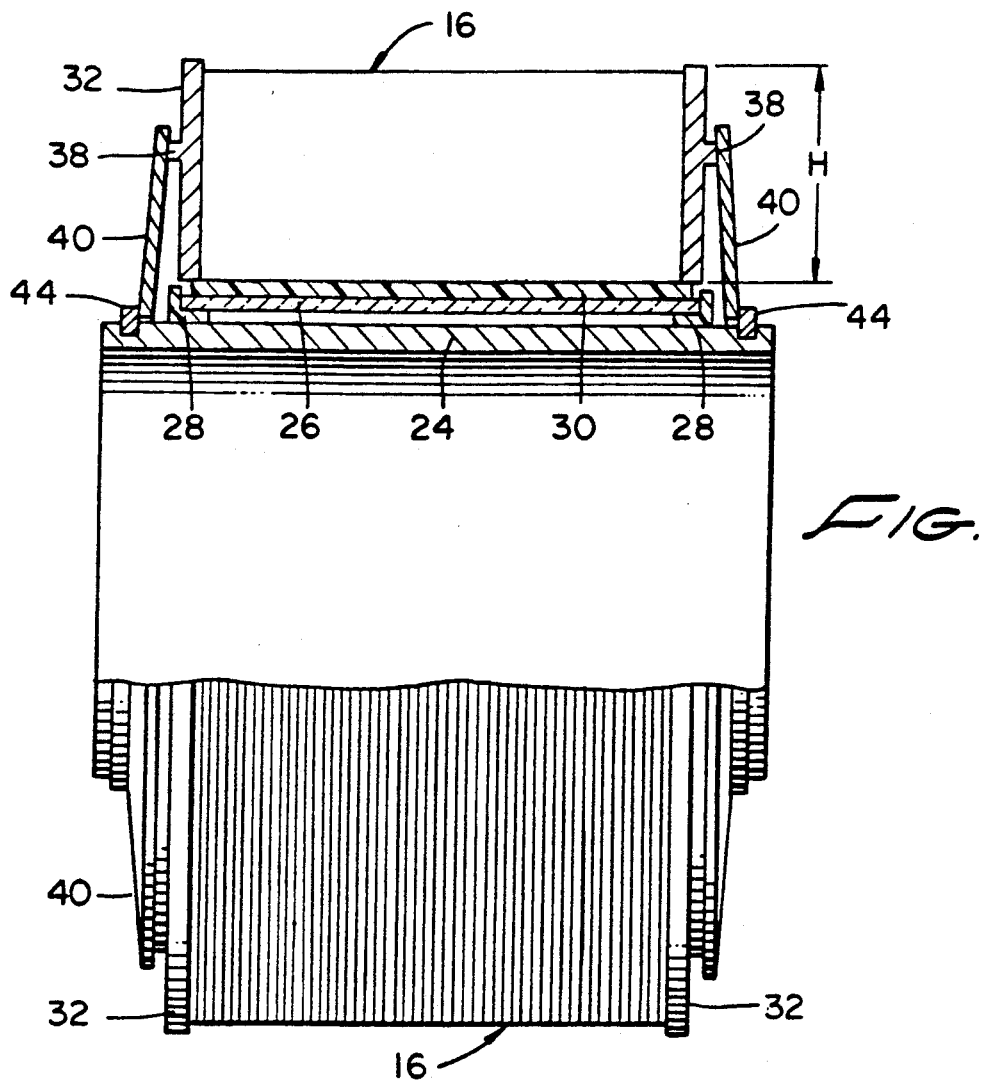
FIG. 3 is a side elevational, partially sectional view of a bobbin of the invention with a wound pack thereon.
Figure 4A:
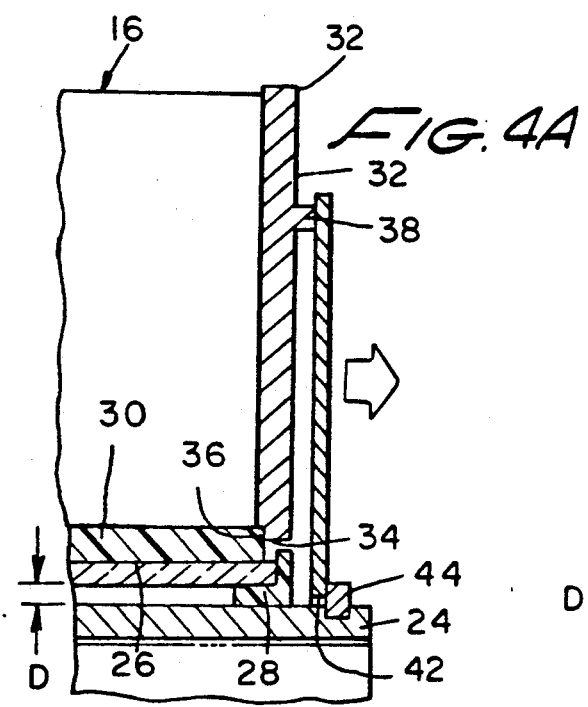
FIGS. 4A and B are side elevational, sectional, partially fragmentary views of the bobbin of this invention shown in nominal and expanded conditions, respectively.
Figure 4B:
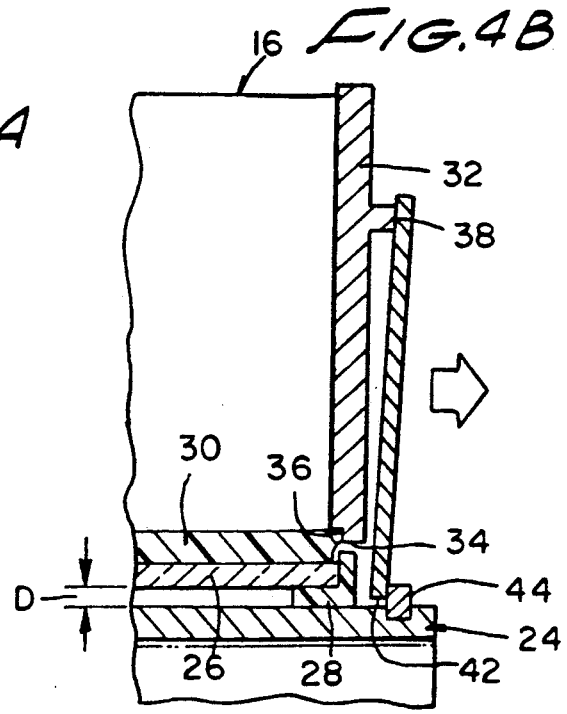

For the ensuing description of a preferred embodiment of the present invention reference is made simultaneously to FIGS. 3 and 4A and B. The innermost part includes a metal tube 24 having open ends and is so dimensioned as to enable mounting onto a conventional coil winding drive apparatus (not shown). A hollow cylindrical winding base 26 is constructed of a material having a relatively low coefficient of thermal expansion such as quartz, for example, and has a bore of such dimensions as to permit fitting receipt onto the metal tube 24 and spaced therefrom an amount D. A pair of cylindrical grommets 28, only one of which is shown, are received on opposite ends of the metal tube 24 and have parts extending under the respective ends of the cylindrical winding base 26 into the space D. These grommets serve to adjustably position the winding base on the metal tube.

A cylindrical baselayer 30 made from a compliant material (e.g., synthetic plastic) is positioned on the winding base 26 and preferably has its ends located equally spaced from and adjacent to the winding base ends. Alternatively, the baselayer may be made either of a rectangular piece that is wound onto the winding base 26 or molded into cylindrical form for sliding receipt onto the base 26.

A pair of identical flanges 32 (only one of which is shown) are provided for mounting on the opposite ends of the baselayer in a way that will be more particularly described. Each flange is a rigid cylindrical plate having a central opening 34 permitting mounting onto the end edge of baselayer 30 via a continuous shoulder 36. The height, H, of the flange is chosen to extend above the largest expected pack thickness. Also, the surface of the flange that faces away from the pack has a circular contact ridge 38 for a purpose to be described.

An annular spring 40 (so-called Belleville spring) has a central opening 42 of sufficient dimensions to enable a free sliding receipt onto an end of the metal tube 24 and overall dimensions such that it will engage the contact ridge 38 when so mounted on the tube. A separate spring 40 is received on each end of the metal tube and they are secured in place by respective snap rings 44. The springs are formed so as to provide resilient bias of the flanges toward the pack 16.

Figure 2A:
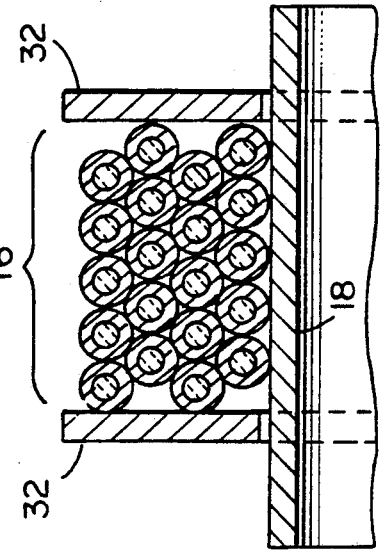
FIGS. 2A, B and C show sectional views of an optical fiber pack of the invention including compliant end flanges.
Figure 2B:
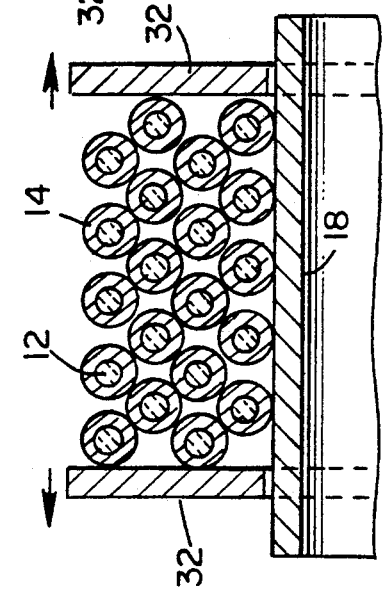
Figure 2C:
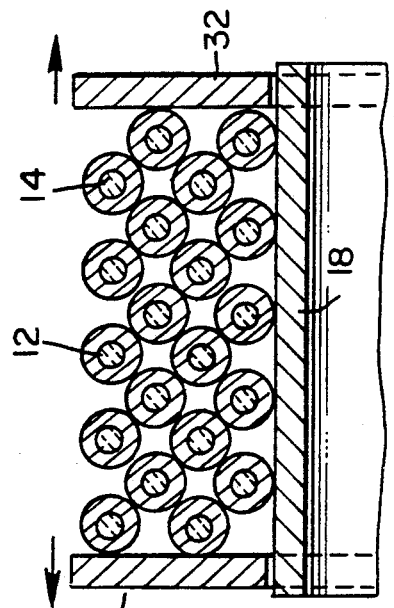

In use of the described bobbin, the cylindrical winding base 26 is relatively unaffected by temperature change and, therefore, contributes substantially nothing in the way of additional stress to the fiber core as did the prior metal bobbin base 18. Temperature and moisture absorption changes in the fiber buffer, on the other hand, are now compensated for by the compliant baselayer 30 and the flanges 32 which can now move axially outward a limited amount against the annular springs 40 (FIGS. 2A-2C). This combined action reduces, if not eliminates, the increase in fiber stress from temperature and moisture absorption sources.

Figure 5:
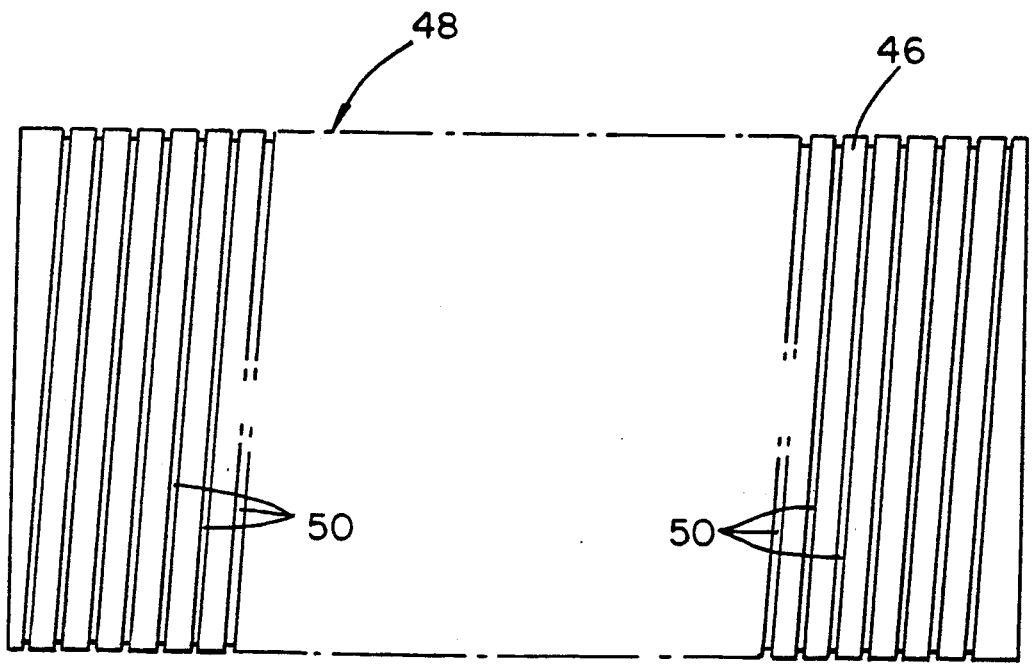
FIG. 5 is a plan view of an alternate version of baselayer.

For the following description of an alternate version, reference is now made to FIG. 5. As shown there, the surface 46 of the baselayer 48 includes a set of generally parallel recesses 50 arranged in predetermined spaced apart relation into which the first layer of the optical fiber pack is wound. Optionally, the recesses may be molded into the baselayer, etched or otherwise formed in the baselayer surface. Otherwise, the baselayer 48 can be identical to baselayer 30 of the first described embodiment.

While particular embodiments of the invention have been shown and described, it will be obvious to those skilled in the appertaining art that changes and modifications may be made without departing from the invention in its broader aspects, and, therefore, the aim in the appended claims is to cover all such changes and modifications as fall within the true spirit and scope of the invention.

What is claimed is:

1. A winding bobbin for supporting a wound filament pack while providing stress compensation within the wound pack, comprising:
   a base constructed of a material having a thermal coefficient of expansion less than metal with the base having an outwardly facing peripheral surface and a longitudinal axis extending throughout;
   a baselayer constructed of a compliant material and supported on the peripheral surface of the base;
   first and second flanges located on opposite end portions of the base layer for retaining the wound pack therebetween;
   means mounting the flanges for limited movement generally parallel to the longitudinal base axis; and
   spring means engaging a surface for each flange for resiliently urging said flanges toward one another, thereby maintaining the flanges in contact with the wound filament pack.

2. A winding bobbin as in claim 1, in which the base is constructed of material having a thermal coefficient of expansion approximating that of quartz.

3. A winding bobbin as in claim 1, in which the baselayer is constructed of a synthetic plastic.

4. A winding bobbin as in claim 1, in which the baselayer has an outwardly facing surface including a plurality of generally parallel recesses of predetermined spaced apart relation onto which the first layer of optical fiber is wound.

5. A winding bobbin as in claim 1, in which the base is cylindrical.

6. A winding bobbin as in claim 1, wherein the base has a hollow, substantially cylindrical configuration with a metal support tube extending completely through the base and a pair of snap rings are mounted on the metal tube, with each snap ring located between one of the flanges and an end portion of the metal tube.

7. A winding bobbin as in claim 6, wherein said spring means comprises a pair of generally ring-shaped Belleville spring members, with each spring member disposed between and engaging a snap ring and adjacent flange for resiliently biasing the flanges into contact with the wound filament pack.

8. A winding bobbin as in claim 1, wherein each flange consists of a rigid cylindrical plate having a central opening formed with an internal shoulder, wherein each flange is disposed with its internal shoulder supported on one of the baselayer end portions.

* * * * *